United States Patent
Simmons

(10) Patent No.: US 11,128,632 B2
(45) Date of Patent: Sep. 21, 2021

(54) METHOD OF CAPTURING USER PRESENCE VIA SESSION UNLOCKING AND CENTRALIZING USING AN IDENTITY DIRECTORY PLATFORM

(71) Applicant: Saudi Arabian Oil Company, Dhahran (SA)

(72) Inventor: Gary Simmons, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 282 days.

(21) Appl. No.: 16/390,365

(22) Filed: Apr. 22, 2019

(65) Prior Publication Data

US 2020/0336487 A1 Oct. 22, 2020

(51) Int. Cl.
*H04L 29/06* (2006.01)
*H04L 9/32* (2006.01)
*H04L 29/12* (2006.01)
*H04L 29/08* (2006.01)

(52) U.S. Cl.
CPC .......... *H04L 63/102* (2013.01); *H04L 9/3215* (2013.01); *H04L 61/1523* (2013.01); *H04L 63/101* (2013.01); *H04L 63/1425* (2013.01); *H04L 67/306* (2013.01)

(58) Field of Classification Search
CPC . H04L 63/102; H04L 9/3215; H04L 61/1523; H04L 63/101; H04L 63/1425; H04L 67/306
See application file for complete search history.

(56) References Cited

U.S. PATENT DOCUMENTS

| | | | |
|---|---|---|---|
| 6,883,015 B1 * | 4/2005 | Geen | G10L 15/30 |
| | | | 703/23 |
| 9,374,369 B2 | 6/2016 | Mahaffey et al. | |
| 10,841,316 B2 * | 11/2020 | Innes | H04L 63/101 |
| 2006/0106944 A1 | 5/2006 | Shahine et al. | |
| 2009/0327247 A1 * | 12/2009 | Jia | H04L 51/04 |
| 2011/0060807 A1 | 3/2011 | Martin et al. | |
| 2013/0055370 A1 | 2/2013 | Goldberg et al. | |

(Continued)

OTHER PUBLICATIONS

Leslie C. Milton, "User Behavioral Modeling of Web-Based Systems for Continuous User Authentication", Dissertation submitted to the Faculty of the Graduate School of the University of Maryland. (Year: 2015).*

(Continued)

*Primary Examiner* — Ghodrat Jamshidi
(74) *Attorney, Agent, or Firm* — Leason Ellis LLP

(57) ABSTRACT

Capturing user presence at a workstation of a local network using an identity directory comprises detecting an unlock event, generating first and second arrays of all instances of respective first and second processes currently occurring in the local network, each instance being associated with a session ID, comparing the first and second arrays to ascertain whether any of the session IDs present in the second array are missing from the first array, performing a query in the identity directory to locate a user account associated with any session ID present in the first array and missing from the second array, and updating a record of the user accounts found in the query in regard to the user presence having been captured in association with the detected unlock event.

14 Claims, 3 Drawing Sheets

(56) References Cited

U.S. PATENT DOCUMENTS

| | | | |
|---|---|---|---|
| 2013/0185643 A1* | 7/2013 | Greifeneder | H04L 67/22 |
| | | | 715/736 |
| 2013/0262560 A1* | 10/2013 | Ivashin | G06F 3/1454 |
| | | | 709/203 |
| 2016/0063227 A1* | 3/2016 | Kobres | G06F 21/316 |
| | | | 726/3 |
| 2016/0088094 A1* | 3/2016 | Kobayashi | H04L 63/108 |
| | | | 709/224 |
| 2017/0249069 A1 | 8/2017 | Zamir | |
| 2018/0096157 A1* | 4/2018 | Israel | G06F 21/6218 |
| 2018/0322099 A1* | 11/2018 | Vembu | G06F 3/0482 |
| 2019/0066417 A1* | 2/2019 | Wang | G07C 9/00896 |
| 2019/0087591 A1* | 3/2019 | Xie | G06F 21/32 |
| 2019/0253884 A1* | 8/2019 | Fan | H04W 8/183 |
| 2020/0076814 A1* | 3/2020 | Cohen | G06F 21/105 |

OTHER PUBLICATIONS

International Search Report and Written Opinion in Corresponding Patent Application No. PCT/US2020/029311 dated Jul. 22, 2020. 8 pages.

Web blog article "Get Logged on Users" published on site "https://p0w3rsh3ll.wordpress.com/2012/02/03/get-logged-on-users/" (found on Feb. 22, 2019).

Web article "Windows: Track User Lock, Unlock, Logon and Logoff Time" published on site "https://sumtips.com/how-to/windows-track-user-lock-unlock-login-logout-time" (found on Feb. 19, 2019).

Web article "4801(S): The workstation was unlocked" published on site "https://docs.microsoft.com/en-us/windows/security/threat-protection/auditing/event-4801" (found on Feb. 21, 2019).

\* cited by examiner

METHOD OF CAPTURING USER PRESENCE VIA SESSION UNLOCKING AND CENTRALIZING USING AN IDENTITY DIRECTORY PLATFORM

FIELD OF THE DISCLOSURE

The present invention relates to information technology (IT) management systems and automated administration, and, more particularly, relates to a method of capturing user presence in view of session unlocking events using an identity directory platform.

BACKGROUND OF THE DISCLOSURE

Microsoft Windows® based environments up through the Windows 10® variants lack inherent mechanisms to easily determine and monitor user presence, i.e., whether a user is currently active on a workstation and if so, at which specific workstation the user is active. Windows® operating systems include components that enable information about user behavior to be collected and centrally stored. However, there is currently no framework to coordinate the embedded operating system components to comprehensively determine and monitor user presence.

More particularly, Windows-based systems do not include controls that use logon information to definitively locate a user. While there are controls that enable a user to be associated with a single client workstation, these controls are not generally practical as they prevent users from being able to log on to another client without an administrative backend update. These measures are purposefully designed in the Microsoft platform because the emphasis is on resource access and services rather than user/client control.

Therefore, it would be advantageous to provide a method of capturing user presence via session unlocking and centralizing using an identity directory platform in which user presence and location can be actively monitored.

SUMMARY OF THE DISCLOSURE

Disclosed herein is a method, executed by a computing device coupled to a local network, of capturing user presence at a workstation using an identity directory, that comprises the steps of detecting an unlock event, generating a first array of all instances of a first process currently occurring in the local network, each instance in the first array being associated with a session ID, generating a second array of all instances of a second process currently occurring in the local network, each instance in the second array also being associated with a session ID, comparing the first and second arrays to ascertain whether any of the session IDs present in the second array are missing from the first array, performing a query in the identity directory to locate a user account associated with any session ID present in the first array and missing from the second array, and updating a record of the user accounts found in the query such that user presence at the workstation is captured in association with the detected unlock event.

In preferred embodiments, the computing device operates using an operating system such as Microsoft Windows® which has a privileged account. Upon detection of the unlock event, the operating system transitions the computing device into the privileged account to enable access to operating system functions. Upon entering the privileged account, the computing device can access program code including computer-executable instructions for generating the first and second arrays.

In certain embodiments, the first process is the logonui.exe process of the Windows® operating system or its functional equivalent process in other operating systems.

In certain embodiments, the second process is the explorer.exe process of the Windows® operating system or its functional equivalent process in other operating systems The query performed by the computing system can an LDAP query performed in an Active Directory, such as is implemented by the Windows® operating system or by a functionally equivalent directory in other operating systems.

In certain embodiments, the disclosed method also includes the steps of determining whether a timestamp value in the record of a user accounts found in the query is greater than a predefined threshold and updating the user record with a current date and time if the timestamp value is greater than the predefined threshold.

Also disclosed herein is a non-transitory computer-readable medium comprising instructions which, when executed by a computing device system, cause the computer system to carry out a method of capturing user presence at a workstation using an identity directory including steps of detecting an unlock event, generating a first array of all instances of a first process currently occurring in the local network, each instance in the first array being associated with a session ID, generating a second array of all instances of a second process currently occurring in the local network, each instance in the second array also being associated with a session ID, comparing the first and second arrays to ascertain whether any of the session IDs present in the second array are missing from the first array, performing a query in the identity directory to locate a user account associated with any session ID present in the first array and missing from the second array, and updating a record of the user accounts found in the query such that user presence at the workstation is captured in association with the detected unlock event.

These and other aspects, features, and advantages can be appreciated from the following description of certain embodiments of the invention and the accompanying drawing figures and claims.

DETAILED DESCRIPTION OF CERTAIN EMBODIMENTS OF THE DISCLOSURE

Disclosed herein is a method of capturing user presence information. Detection of an unlock event at a client workstation using functionality present in the operating system triggers a process that identifies the unlocking user. According to the method, an object is generated that identifies the user to a centralized accessibly directory. The updated directory indicates the location (workstation) of the user within a specifically defined time/latency period. This information is then made available to suitably authorized processes or users in order to target and identify users based on their most recent location. The disclosed method promotes resource availability, targeting information delivery and general identity-based processes with location dependence. The method is embodied in program code which can be stored in non-transitory media accessible for execution by computing devices with processing capability.

Figure 1:
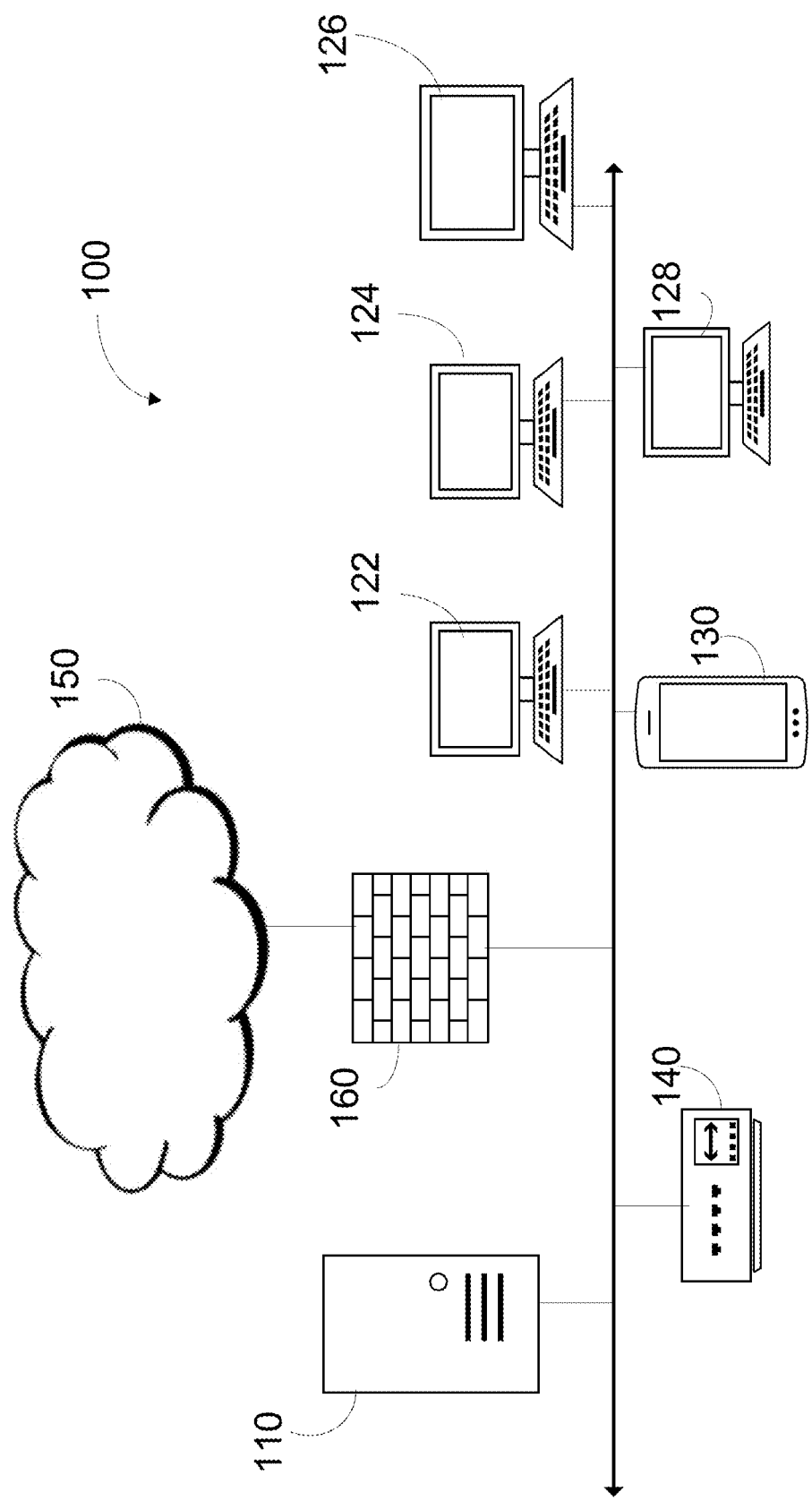
FIG. 1 is a schematic diagram of an exemplary local network system in which embodiments of the disclosed method of capturing user presence via session unlocking and centralizing using an identity directory platform can be implemented.

FIG. 1 is a schematic diagram of a local network system in which embodiments of the disclosed method of capturing user presence via session unlocking and centralizing with an identity directory platform can be implemented. The network 100 includes a server 110 that provides administrative and other service roles, such as File Server and Directory Server, to a plurality of client workstations, 122, 124, 126, 128, 130 communicatively coupled to the server 100 via a wired or wireless communication medium 135. The server 100 and workstations 122-130 can intercommunicate over medium 135 using Ethernet, Token Ring or any other suitable networking protocol. The network 100 can also include one or more switches or hubs facilitate network traffic collectively represented by hub 140. Interconnection to an external network 150, such as the Internet can be intermediated by a firewall 160 which provides a level of security to the network from incoming communications from the external network 150.

In the embodiment depicted, workstations 122, 124, 126, 128 are desktop or laptop computers and workstation 130 is a smart mobile device. However, the number of workstations and their respective hardware implementation is arbitrary and more or fewer workstations of the same or different device types can be used. The server and workstation resources of the network 100 can use a Microsoft Windows® operating platform in one implementation of the disclosed invention. In some implementations, the server 110 has an operating system adapted for server components, such as Microsoft Server 2019, and workstation components 122-130 have a client operating system such as Windows 10® or Windows 10 Pro®.

The Windows Server® operating system configures the network in terms of Windows domains. In a Windows® domain all user accounts, workstations and other hardware resources are registered with a central database located on one or more clusters of central computers referred to as domain controllers. In the system of FIG. 1, the server 110 is configured as a domain controller. Authentication events are executed by the domain controller. Each person who uses computers within a domain receives a unique user account that can then be assigned access to resources within the domain. In Windows Server®, an identity management directory platform ("identity directory) is implemented by Active Directory, which is the Windows® component that is operative to maintain a central database of user information. More specifically, administrators use Active Directory to store and organize objects on a network (such as users, computers, devices, and so on) into a secure hierarchical logical structure. The hierarchical structure includes forests, which are the highest level and comprises the security border of the network, and domains which are delineated portions of the forest, that can provide data and services independently.

Figure 2:
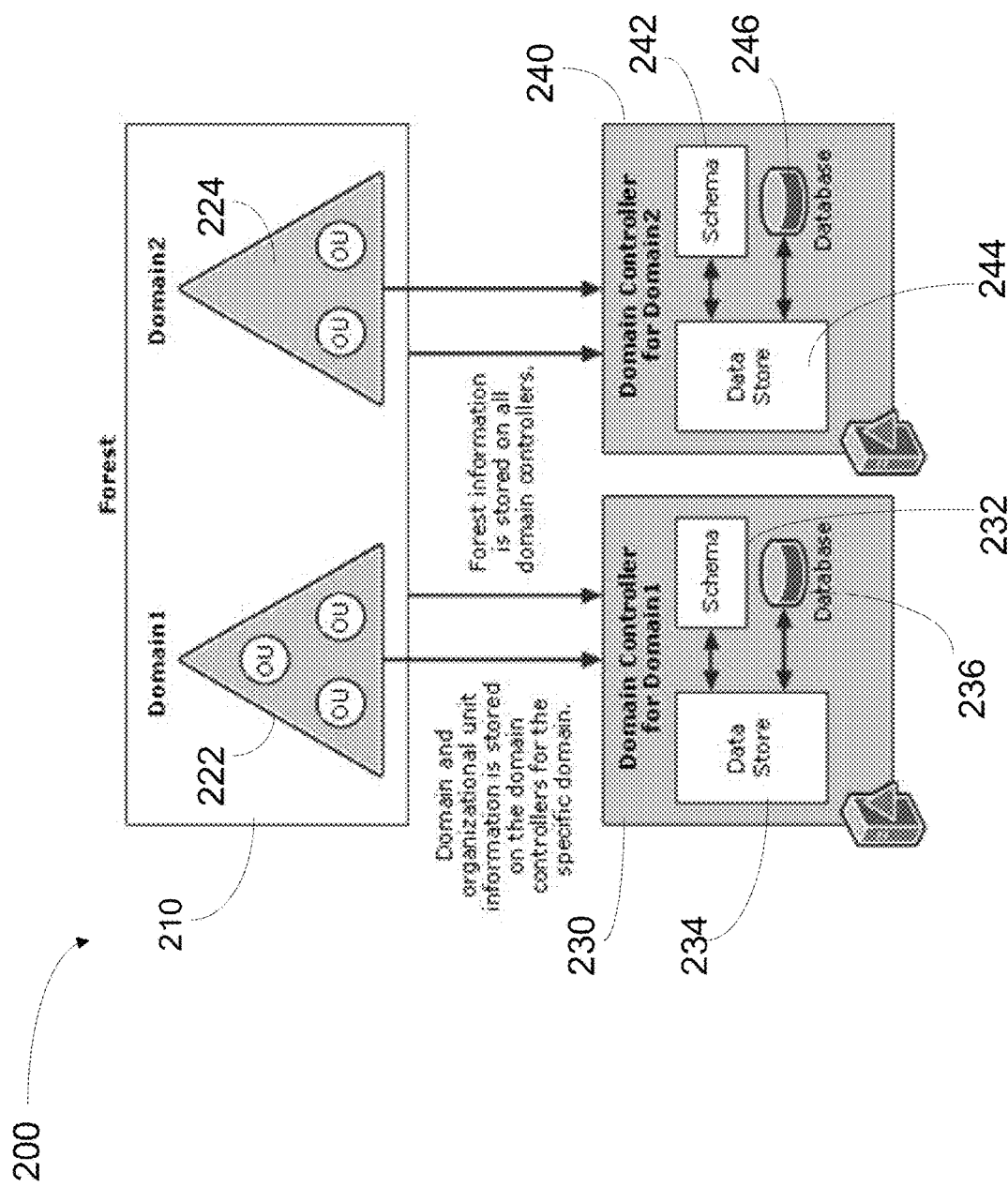
FIG. 2 is a schematic diagram of an exemplary Active Directory architecture used in the Microsoft Windows® operating systems.

FIG. 2 is a schematic diagram of an example Active Directory architecture 200 based on Microsoft Server. The illustrated architecture comprises a forest 210 that is partitioned into a first logical domain 222 and a second logical domain 224. Each of the domains 222, 224 can comprise a plurality of separate organizational units. Each domain is controlled by a domain controller, with domain 222 being controlled by a first domain controller 230 and domain 224 being controlled by a second domain controller. Domain controllers 230, 240 can be implemented by a computer system that uses the Microsoft Server operating system. A domain name system (DNS) provides a name resolution service for the domain controller location and a hierarchical design which Active Directory uses to provide a naming convention in order to represent the organizational structure.

Domain controller 230 includes a schema 232, a data store 234, and a database 236. The schema 232 includes program code for providing definitions that are used to create the objects that are stored in the directory. The object definitions include two primary components, classSchema objects, which define object classes, and attributeSchema objects, which define the attributes of individual objects. The data store 234 is a program or set of programs executed by the domain controller that manages the storage and retrieval of data in each domain controller. For example, the data store includes application program interfaces (APIs) such as the lightweight directory access protocol (LDAP), and a messaging API. The database 236 can comprise the data repository for all object data used by Active directory in the domain 230. The data store 234 includes both services and physical files which make the directory available and, via the APIs, manages the processes of reading and writing the data to the database 236. Domain controller 240 includes similar schema 242, data store 244 and database 246 components.

The data store of any or all domains can be a shared resource accessible to all workstations in a local network. In some implementations, shared data, such as identity directory information, is supplied by interaction between workstations and a file server. In Windows® systems, the Windows® network component provides resource sharing using SMB (Server Message Block) protocol. The identity directory includes a list of user names in the network. User presence data including session IDs, and the workstation at which the user has last been detected as being present, are stored in records associated with the user names in the directory. The identity directory can provide data centralization by operating as a repository in which user presence information is updated and is accessible to all users of the network.

Figure 3:
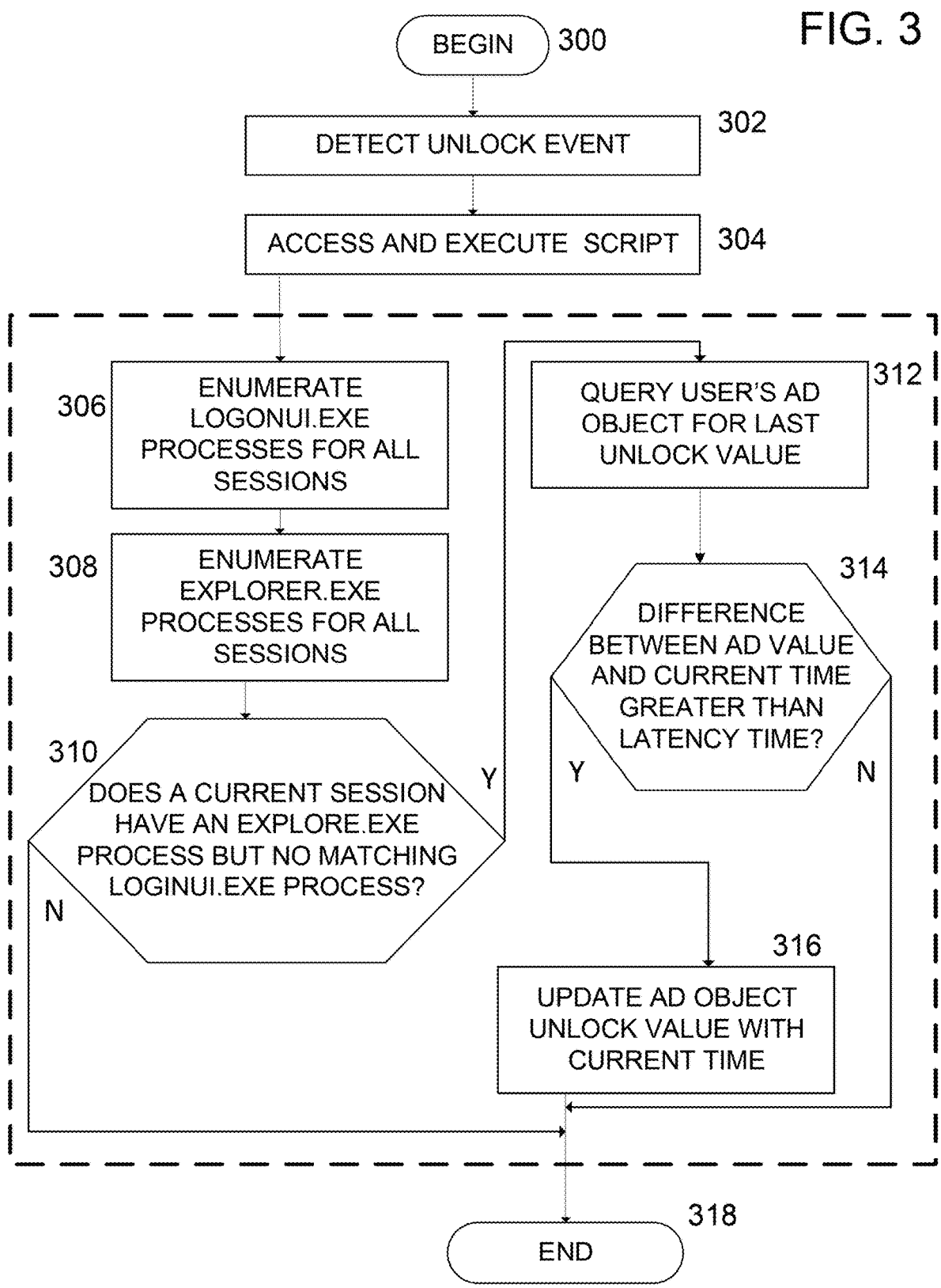
FIG. 3 is a flow chart of an exemplary embodiment of a method of capturing user presence via session unlocking and centralizing with an identity directory platform according to the disclosure.

Reference is now made to FIG. 3 which is a flow chart of an exemplary embodiment of a method of capturing user presence via session-unlocking and session-centralizing using an identity directory platform. The method can be executed by a processor at any of workstations 122-130 in the local network, or by a processor of the administrative server 110 based on stored program code. Server 110 also functions as a domain controller that can access and manage the Active Directory for the local network domain 100. In step 300, the method begins. Windows® operating systems, for instance, include embedded monitoring processes which continually run and can recognize when a user unlocks a workstation. The unlocking of a workstation is referred to as an "unlock event." In step 302, the ongoing monitoring process detects such an unlock event. In step 304, in response to the unlock event, server 110 accesses and executes additional program code associated with the unlock event. The code is executed with the highest allowed privileges in a "Task account." The Task Account is a secure environment which is not visible to and which is protected from tampering by the end user; however, the Task Account itself has full visibility across all sessions and processes on the workstation.

In some embodiments, the program is implemented as a Powershell script. Powershell is a shell platform (i.e., an administrative user interface) developed by Microsoft that provides an administrative user interface to services of Windows® operating systems. PowerShell is based on the .NET framework an includes a command-line shell and a scripting language. PowerShell enables the automation and rapid execution of administration tasks. For example, PowerShell can be used to determine and display all of the hardware devices installed on one or more workstations. In alternative embodiments, the program can comprise a compiled application written in a lower level programming language (C++, C#, etc.) implemented as a Windows® service. Compiling the application as a service module can be advantageous for large scale rollouts because the compiled application is self-contained, and, as a service, can be readily managed from an operational perspective. The program code can be stored at any location that the Task Account can access. In certain embodiments, the program code is stored in centrally managed file shares that all workstations in the network can access. However, as the Task Account is a system account, access to the program code is not visible to the end user.

In step 306 of the exemplary embodiment, the administrative server 110 obtains all instances of the logonui.exe process running on the network with the associated sessionID of each instance. Each sessionID is unique per logged-on user. The instances and associated sessionIDs are enumerated and stored, for instance, in an array ("logonui.exe array"), list, or other searchable data structure. The logonui.exe file is a software component of Microsoft Windows® that generates a Logon User Interface, which is the graphical user interface for user authentication. Logonui.exe is a core component of the Windows® operating system. In addition to facilitating user login into a workstation, logonui.exe also determines if the user has logged-in and logged-out properly and enables switching between users. In step 308, the server similarly obtains all instances of the explorer.exe process running on the network. Each instance of explorer.exe is stored, e.g., in an array, list, or other searchable data structure and is also associated with a user sessionID. The instances of explorer.exe and their associated session IDs are enumerated and stored in a second array ("explorer.exe array"). The explorer.exe file comprises the user shell which includes the taskbar, desktop, and other user interface features of the Windows® environment.

In the following step 310 of the exemplary embodiment, the server compares the logonui.exe instance array with the explore.exe instance array. More specifically, in step 310, the server determines whether there are any session IDs that are associated with an instance of explorer.exe that are not also found in the logonui.exe array. If it is determined that there are one or more sessionIDs present in the explorer.exe array that are not present in the logonui.exe array (i.e. determination=Yes), then it can be inferred that the user(s) associated with such sessionID does not have a CTRL-ALT-DELETE prompt present and that the sessionID therefore represents an unlocked session. This is because Windows® clients can have only two open sessions, and only one of the two can be an active session. Following a determination of "Yes", in step 312, an LDAP query is performed to locate the user with the associated sessionID in the Active Directory. The query is designed to retrieve the value of a pre-defined attribute in the Active Directory which indicates the last time the activity stamp of the user was updated. In step 314, it is determined whether the last discovered timestamp is greater than a predefined threshold latency time. If the last discovered timestamp is greater than the threshold latency time, in step 316 the current Active Directory Site location (e.g. IP address) of the user workstation is determined and the Active Directory attribute (e.g., timestamp) is updated using the client's current IP address. The current IP address indicates the particular computing device at which the unlock event has occurred. The current IP address is recorded in the identity directory enabling certain operations; for instance, communications to the user can be automatically be sent or forwarded to the user workstation at the current IP address. In certain implementations, the updated string value written to the Active Directory of the user is formatted as <AD Site>, <Client Name>, <TCP/IP Address>, <Current Date and Time>. After step 316, the method ends, as indicated at step 318. Alternatively, if is determined that the timestep is less than the predefined threshold latency in step 314, or following a determination of "No" at step 312, the method also ends, again, as indicated at step 318.

Once the method ends, the Active Directory can then be queried at any time by required entities or processes to discover the current activity of the user environment. This data is accurate to the predefined latency time.

As noted above, Windows® is one operating system in which the invention has particular utility, but there are other operating systems in which capturing user presence at a workstation using an identity can be performed. In such implementations, the server can be configured to compare instances of logins, as described above, with other data indicative of active sessions using a processor suitably configured with code executing therein. Such a processor can be configured to determine whether there are any sessions associated with an active user which are not known from the instances of logins. This determination can then be used as a proxy that there is one or more than one unlocked session. While the Windows®-operating systems presently are configured to allow only one active session, in other operating systems, there can be more than one active session and the technique described herein can be used to determine the location (IP address) of a particular user using the methodology outlined above.

It is to be understood that any structural and functional details disclosed herein are not to be interpreted as limiting the systems and methods, but rather are provided as a representative embodiment and/or arrangement for teaching one skilled in the art one or more ways to implement the methods.

It is to be further understood that like numerals in the drawings represent like elements through the several figures, and that not all components and/or steps described and illustrated with reference to the figures are required for all embodiments or arrangements.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing, and are not to be construed as limiting. However, it is recognized these terms could be used with reference to a viewer. Accordingly, no limitations are implied or to be inferred.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method, executed by a computing device coupled to a local network, of capturing user presence at a workstation using an identity directory, comprises the steps of:
   detecting an unlock event;
   generating a first array of all instances of a first process currently occurring in the local network, each instance in the first array being associated with a session ID;
   generating a second array of all instances of a second process currently occurring in the local network, each instance in the second array also being associated with a session ID;
   comparing the first and second arrays to ascertain whether any of the session IDs present in the second array are missing from the first array;
   performing a query in the identity directory to locate a user account associated with any session ID present in the first array and missing from the second array; and
   updating a record of the user accounts found in the query, whereby user presence at the workstation is captured in association with the detected unlock event.

2. The method of claim 1, wherein the computing device operates using an operating system having a privileged account and upon detection of the unlock event, the operating system transitions the computing device into the privileged account to enable access functions of the operating system.

3. The method of claim 2, wherein upon entering the privileged account, the computing device accesses program code including computer-executable instructions for generating the first and second arrays.

4. The method of claim 2, wherein the first process is a logonui.exe process.

5. The method of claim 2, wherein the second process is an explorer.exe process.

6. The method of claim 2, wherein the query is an LDAP (Lightweight Directory Access Protocol) query performed in an Active Directory implemented by the operating system.

7. The method of claim 1, further comprising the steps of:
   determining whether a timestamp value in the record of a user accounts found in the query is greater than a predefined threshold; and
   updating the user record with a current date and time if the timestamp value is greater than the predefined threshold.

8. A non-transitory computer-readable medium comprising instructions which, when executed by a computing device system, cause the computer system to carry out a method of capturing user presence at a workstation using an identity directory including steps of:
   detecting an unlock event;
   generating a first array of all instances of a first process currently occurring in a local network, each instance in the first array being associated with a session ID;
   generating a second array of all instances of a second process currently occurring in the local network, each instance in the second array also being associated with a session ID;
   comparing the first and second arrays to ascertain whether any of the session IDs present in the second array are missing from the first array;
   performing a query in the identity directory to locate a user account associated with any session ID present in the first array and missing from the second array; and
   updating a record of the user accounts found in the query in regard to the user presence having been captured in association with the detected unlock event.

9. The non-transitory computer-readable medium of claim 8, wherein the instructions are adapted to an operating system having a privileged account and upon detection of the unlock event, the instruction cause the operating system to transition the computing device into the privileged account to enable access to operating system functions.

10. The non-transitory computer-readable medium of claim 9, wherein upon entering the privileged account, the instructions cause the computing device to access program code including computer-executable instructions for generating the first and second arrays.

11. The non-transitory computer-readable medium of claim 9, wherein the first process is the logonui.exe a login process of the Windows operating system.

12. The non-transitory computer-readable medium of claim 9, wherein the second process is a search process of the operating system.

13. The non-transitory computer-readable medium of claim 9, wherein the query is an LDAP (Lightweight Directory Access Protocol) query performed in an Active Directory implemented by the operating system.

14. The non-transitory computer-readable medium of claim 8, further including instructions for causing the computer system to perform the steps of:
   determining whether a timestamp value in the record of a user accounts found in the query is greater than a predefined threshold; and
   updating the user record with a current date and time if the timestamp value is greater than the predefined threshold.

* * * * *